2,959,378
Patented Nov. 8, 1960

2,959,378

DEVICE FOR THE CONTROL AND COORDINATION OF THE CONTROLS OF AN AIRCRAFT

Gerhard Eggers, Günther Ernst, and Gerhard Richter, all of Dammarie les Lys, France, assignors to Societe Nationale d'Etude et de Construction de Moteurs d'Aviation, Paris, France, a French company Filed Apr. 9, 1958, Ser. No. 727,360

Claims priority, application France Apr. 17, 1957

5 Claims. (Cl. 244—52)

Since the conventional aerodynamic controls are only effective beyond a certain speed of flight while the controls by action on the jet, which are effective at low speeds of flight or at zero speed, lose their effectiveness with the increase in the speed of flight, it is necessary to equip aircraft which take off and land vertically with both types of control because of the great difference which exists between the maximum speed and the minimum speed of this type of aircraft.

The present invention relates to a device for piloting such aircraft which enables the action of the two types of control to be coordinated as a function of the speed and of the form of flight.

More specifically, this device is designed to permit the combined control of the aerodynamic controls and of the controls by action on the jet during normal horizontal flight and the exclusive control of these latter controls during vertical take-off and landing manoeuvres. A stabilization chain of the gyroscopic type for example, may then be used by means of the device of the invention, while during normal flight, this chain, or at least a portion thereof, has no action on the controls.

According to one feature of the invention, the electric circuits of the two control systems are connected to a suitably connected switch which permits passage from one system to the other, which switch, incidentally, may have an intermediate position corresponding to the passage from vertical flight to horizontal flight and vice versa.

In one embodiment of the invention, the control by action on the jet is associated with a return loop supplying the electric signals which are a function of the speed of displacement of said controls, and a delay circuit may be introduced into said loop during flight in the vertical position and during a change of trim of the aircraft, whereas said delay circuit is disconnected in horizontal flight.

The following description with reference to the accompanying drawings, will explain the various features of the invention and the means of carrying them out, every device appearing either in the text or in the figures naturally coming within the scope of the present invention.

Figure 1:
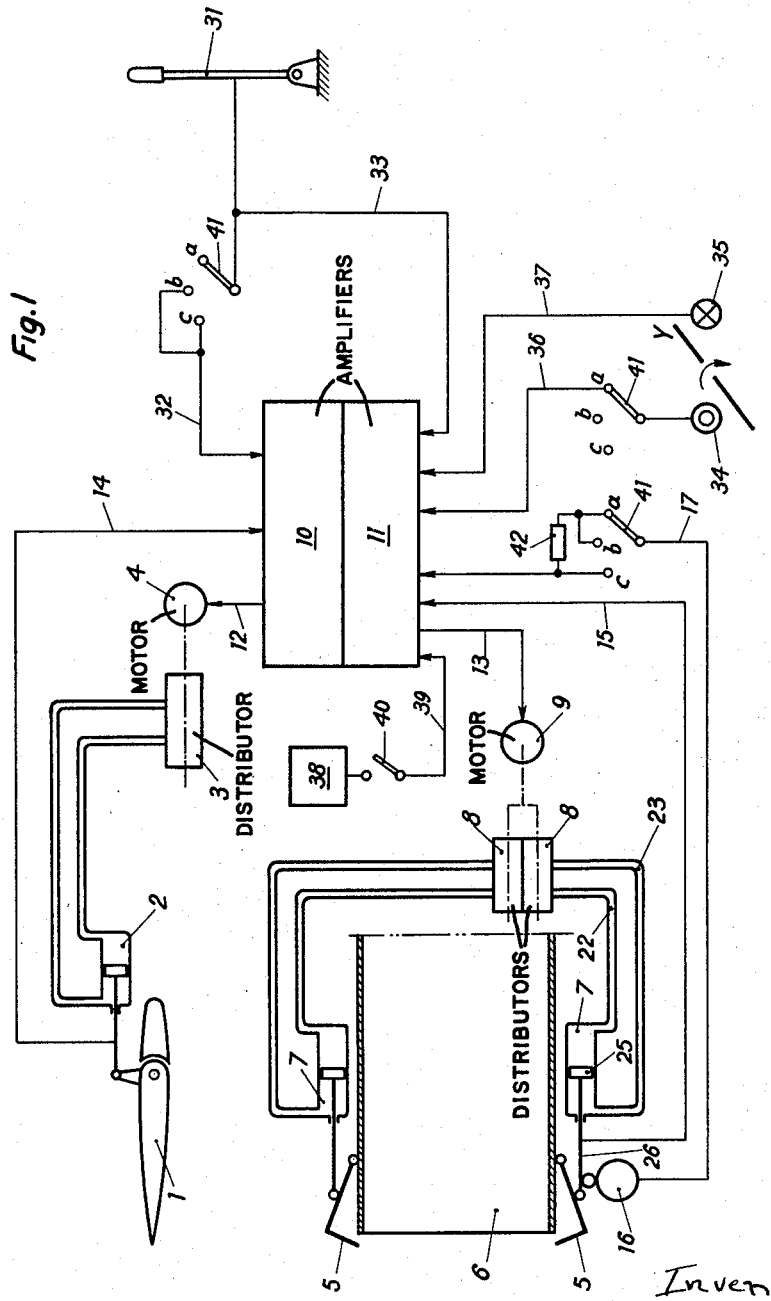
Figure 1 is a diagrammatic general view of one embodiment according to the invention.

For the sake of greater clarity, Figure 1 only illustrates the aerodynamic controls and the control by action on the jet permitting evolutions of the aircraft about its transverse axis or lateral axis.

The aerodynamic controls consist of a flap 1 actuated by a hydraulic jack 2 fed from a distributor 3 coupled to an electric motor 4. The control by action on the jet comprises two retractable obstacles or flaps 5—5 placed at the ends of one diameter of the propulsive pipe 6 and capable of deflecting the jet upwards or downwards when they are thrust to a greater or lesser extent into the jet.

These flaps are actuated simultaneously and in opposite senses by two hydraulic jacks 7—7 fed by two conjugated distributors which are fed by a pump (not shown) and 8—8 which may be combined. As in the case of the aerodynamic controls, the distributor 8 controlling the hydraulic jacks of the control by action on the jet is controlled by an electric motor 9.

The electric motors 4 and 9, for example two-phase motors, are respectively controlled by amplifiers 10 and 11 which may be of the magnetic type and which supply said motors with the appropriate control currents through the leads 12 and 13 respectively. Return loops 14 and 15 send back to the amplifiers 10 and 11 signals which are a function of the position of the corresponding controls. Moreover, in the case of the control by action on the jet, a suitable device 16, such as a tachometric dynamo, applies to the amplifier 11, through the lead 17, a signal which is a function of the speed of displacement of the flaps.

Figure 2:
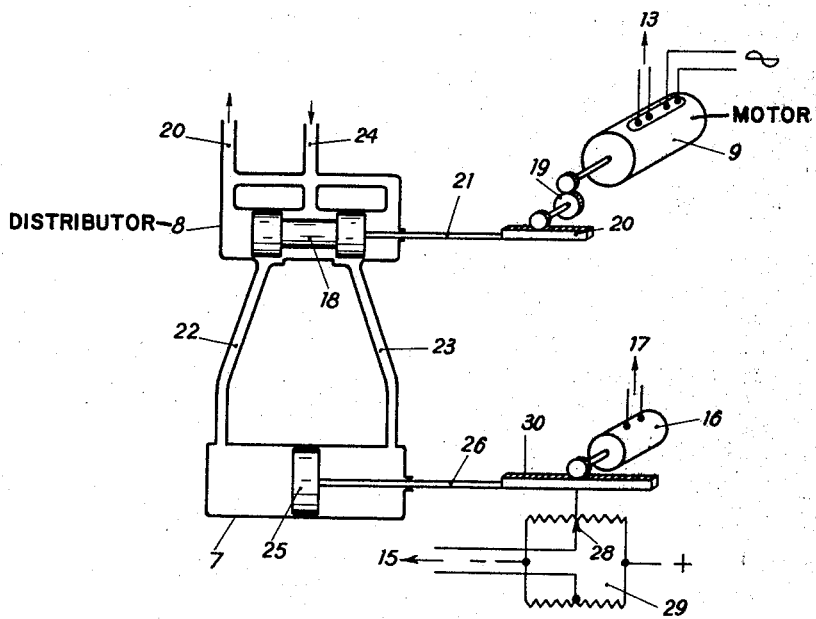
Figure 2 is a detail view on a larger scale.

Figure 2 shows, on a larger scale, one embodiment of the return signal generators, depending on the instantaneous position and on the speed of displacement of the corresponding control member.

The hydraulic jack is seen at 7 and at 8 the distributor of the slide-valve type 18 feeding said hydraulic jack. Through a reduction gear 19 and a rack 20, the rotation of the two-phase motor 9 drives the rod 21 of the slide 18 which feeds one or other of the pipes 22, 23 of the jack 7. According to the direction of rotation of the motor 9, the liquid coming under pressure from a pump (not illustrated) through the pipeline 24 is directed into one or the other of the pipes 22, 23, thus determining the face of the piston 25 which receives the thrust of the liquid and consequently the direction of action of the control attached to the rod 26 of said piston. The return of the liquid to its reservoir is effected through the pipeline 27.

The rod 26 connecting the piston 25 to the control drives on the one hand the slide 28 of a potentiometer interposed in a Wheatstone bridge 29 and on the other hand a tachometric dynamo 16 by means of a rack 30.

Through the leads 15 and 17, the Wheatstone bridge 29 and the tachometric dynamo 16 supply signals which are a function respectively of the position and of the speed of displacement of the rod 26 and hence of the corresponding control.

Since the speed of the piston 25 of the hydraulic jack 7 is proportional to the displacement of the slide 18 of the distributor valve 8 feeding said jack, the tachometric dynamo 16 may be replaced by a Wheatstone bridge, a slide of which is driven by the rod 21 of the distributor as described in the French patent application of December 4, 1956 for "Electro-Hydraulic Jack Device for the Stabilization Control of Aircraft."

In the case of the aerodynamic control, it is not necessary to provide a generator such as the tachometric dynamo, said control only being used at high speeds. The return loop for the position signals is sufficient, and said signals may be produced by a Wheatstone bridge similar to the bridge 29 and bearing the reference numeral 43 on Figure 3.

This figure also shows coils 50 and 51 belonging respectively to the magnetic amplifiers 10 and 11 and connected to the control phase, the two-phase motors 4 and 9 being directly connected to the reference phase.

Returning to Figure 1, it will be seen that the amplifiers 10 and 11 supply, through 12 and 13, the signals for controlling the controls 1 and 5 and receive in return, through 14 and 15, signals giving the instantaneous position of said controls, while the amplifier 11 also receives, through 17, a signal which is a function of the speed of displacement of the control 5 by action on the jet.

The action of the amplifiers 10 and 11 is regulated by the joy-stick 31 which displaces the slides of two Wheatstone bridges 44 and 45 (see Figure 3) and creates unbalanced currents which are applied to the amplifiers 10 and 11 through the leads 32 and 33 respectively.

In addition, an automatic stabilization control for the aircraft is associated with the amplifier 11; this automatic control comprises a gyroscope 34 which detects the angular position of the aircraft in relation to its transverse axis represented by Y in Figure 1 and a gyrometer 35 which detects the angular speed about said axis. The gyroscope 34 and the gyrometer 35 displace the slides of two Wheatstone bridges 46 and 47 which thus emit signals depending on the position and on the angular speed of the aircraft and apply them to the amplifier 11 through the leads 36 and 37 respectively.

Finally, the amplifier 11 may receive another signal emitted by a suitable generator 38 and adapted to effect the swinging of the aircraft from the vertical position to the horizontal position as will be explained below. This generator is connected to an input of the amplifier 11 through a lead 39 provided with a circuit-breaker 40.

A switch 41 with three positions a, b and c is inserted in each of the channels 17, 32 and 36. When this switch is on the contact a, a delay circuit 42 is introduced into the lead 17, the channel 36 is established while the lead 32 is interrupted. When the switch is moved over to the contact b, the lead 17 is not affected, but the lead 32 is established whereas the lead 36, on the other hand, is interrupted. This condition of the leads 32 and 36 is preserved when the switch 41 is in the position c but in the case of lead 17, the delay circuit 42 is short-circuited.

Figure 3:
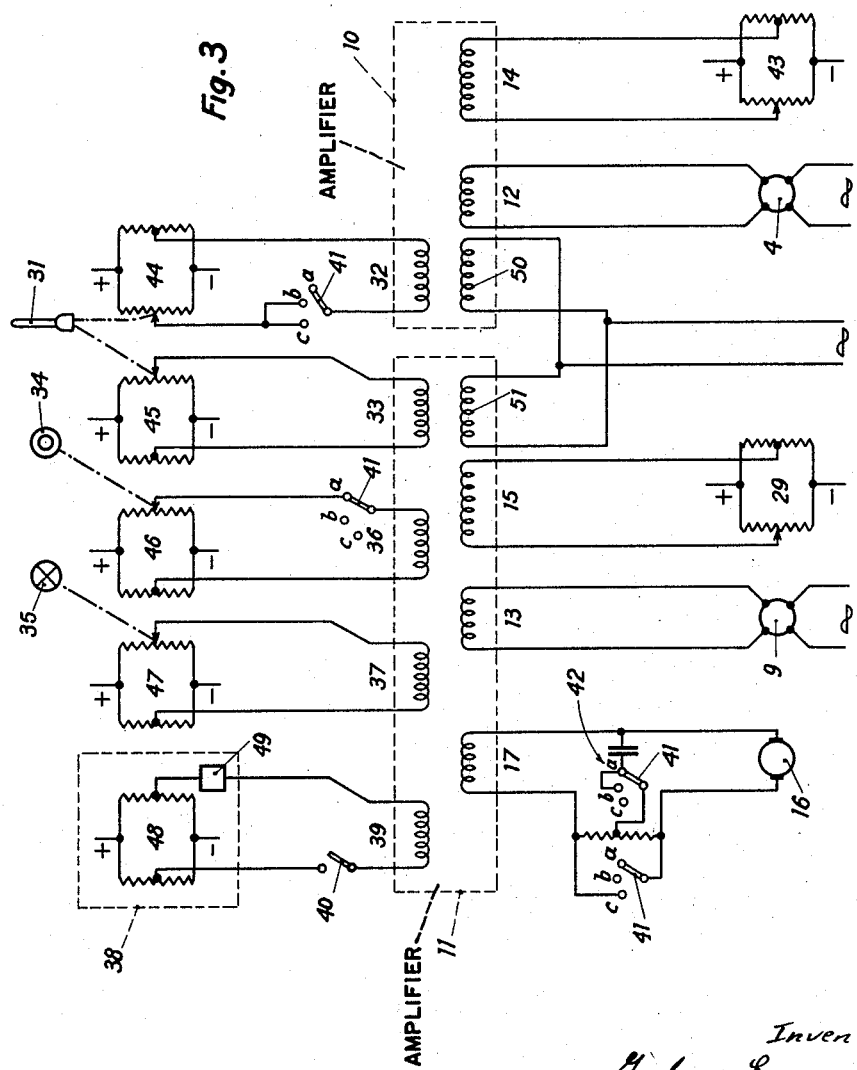
Figure 3 is an electric wiring diagram of the device in Figure 1.

The operation of the device which has just been described will be explained with reference more particularly to Figure 3.

During vertical take-off and landing as well as during flight in the vertical position, the aerodynamic control has no effect because of the low speeds; it is even harmful in the sense that, if deflected, it would produce moments of instability. The present invention enables said control to be held in a neutral position during the above manoeuvres.

For this purpose, the pilot places the switch 41 on the contact a thus interrupting the lead 32 and consequently the existing connection between the amplifier 10 controlling the areodynamic control and the joy-stick 31.

Thus the displacements of the latter are expressed by the currents of corresponding sign and strength, generated by the Wheatstone bridge 45 and applied to the amplifier 11 through the lead 33. Added to these control currents are the stabilization signals supplied by the gyroscope 34 and the gyrometer 35 by means of the Wheatstone bridges 46 and 47 and of the leads 36 and 37 (the lead 36 being established because the switch 41 is on the contact a).

All these input signals at the amplifier 11 cause voltages to appear at the terminals of the windings corresponding to the leads 33, 36 and 37, and a portion of the algebraic sum of these voltages determines the phase-displacement and the strength of the output current in the lead 13 leading to the two phase motor 9 and consequently the speed and the direction of the latter, and hence the displacement of the flaps.

The extent and the speed of this displacement are translated by the Wheatstone bridge 29 and the tachometric dynamo 16 into signals applied to the amplifier 11 through the return loops 15 and 17. In the case of this latter loop, since the switch 41 is on the contact a, the delay system 42 consisting of a resistance-capacity circuit is interposed between the dynamo 16 and the winding of the amplifier 11 corresponding to the channel 17, in such a manner as to impart the maximum acceleration to the motor 9 (which is necessary for a good stability of the aircraft) during the period of this delay, until the speed-position equilibrium corresponding to the signals supplied by 31, 34 and 35 is established.

Thus the control by action on the jet reacts to any voluntary control exerted by the stick 31 as well as to the accidental angular displacements of the aircraft detected by the gyroscope 34 and the gyrometer 35 which constitute the stabilization chain of the device. The return loops 15 and 17 for the position and speed of displacement of the flaps enable the ampere turns of the input windings 33, 36 and 37 to be neutralized when the desired steering effect has been obtained.

In order to pass from vertical flight to horizontal flight, the switch 41 is placed on the contact b and the circuit-breaker 40 is closed.

The passage of the switch 41 to b interrupts the lead 36 and thus disconnects the gyroscope 34 (which always preserves the vertical position), while the channel 32, on the other hand, is established and consequently the control of the aerodynamic control is connected in; finally, the delay circuit 42 remains interposed in the return loop for the speeds 17.

The closing of the circuit breaker 40 closes the circuit of the winding of the magnetic amplifier 11 corresponding to the lead 39 connected at two non-symmetrical points to a potentiometric bridge 48, which points are selected once and for all in such a manner that the voltage generated at the terminals of 39 determines, in the lead 13, the voltage which, on actuating the two-phase motor 9, will cause the deflection of the flaps 5 by the amount necessary to produce the desired control moment, that is to say that which will give the aircraft the impetus required to cause it to swing from the vertical position into the horizontal position.

A delay relay 49 or any other brief contact enables the time of closing of the circuit to be limited to the period necessary for the intended manoeuvre.

In normal or horizontal flight, the switch 41 is placed on the contact c, thus disconnecting the delay system 42 from the loop 17, leaving the gyroscope 34 disconnected and the stick 31 connected. The displacements of the latter will be deflected, through the amplifiers 10 and 11, not only on the two-phase motor 4 controlling the aerodynamic control 1 but also on the two-phase motor 9 controlling the flaps 5. The return loops 14 of the aerodynamic control and 15—17 of the control by action on the jet will supply the appropriate signals for restoring said controls to the neutral position when the desired effect has been achieved.

In order to resume the vertical position before landing, the switch 41 is replaced in the position b, but the contact 40 of the automatic control is not actuated being used only for swinging from vertical flight into horizontal flight. In the reverse swinging, since the jet engine is not running at its maximum speed, the controls by action on the direction of the jets are no longer sufficiently effective and the swinging may be obtained by a nose-lifting control provided by the aerodynamic controls. When the aircraft resumes the vertical flight position, the switch 41 is replaced in position a.

In the example which has just been described, the stabilization chain of the aircraft utilizing a gyroscope and a gyrometer is associated only with the magnetic amplifier controlling the control by action on the jet, while the aerodynamic control is controlled only by the joy-stick. It is obvious, however, that other combinations could be envisaged, for example:

(a) As in the example described, the aircraft is equipped with conventional aerodynamic controls, with controls by action on the direction of the jet, with an automatic stabilization chain having a gyroscope and gyrometers as detector members. But in this case, the aerodynamic controls are actuated from the controls by action on the jet while the stabilization chain acts directly on the controls by action on the direction of the jet and the position given to these controls determines, by means of a suitable servo-system, the position of the aerodynamic controls. An amplitude and phase adapter enables a suitable coordination of the two types of control to be obtained for the various changes in the trim of the aircraft. The pilot's controls then act through the automatic stabilization chain.

(b) The aircraft has conventional aerodynamic controls, controls by action on the direction of the jet and two automatic stabilization chains, one acting on the aerodynamic controls, the other on the controls by action on the direction of the jet. The pilot's controls act, in this case, through the two automatic stabilization chains.

What we claim is:

1. A device for the control and coordination of the controls of a vertical take-off and landing aircraft propelled by a jet propulsion unit and equipped with aerodynamic controls and with controls by action on the jet issuing from said propulsion unit, comprising first means for controlling said aerodynamic controls, second means for controlling said controls by action on the jet, a first amplifier for feeding first control signals to said first means, a second amplifier for feeding second control signals to said second means, third means for feeding input signals to both said first and second amplifiers, a stabilization chain including gyroscopes which detect angular movements of said aircraft and connected to said second amplifier, and a main switching means, for a first position of which corresponding to a vertical flight of said aircraft, said third means is disconnected from said first amplifier while said second amplifier is connected with said third means and with said stabilization chain, and for a second position of which corresponding to a horizontal flight of said aircraft, said stabilization chain is disconnected from said second amplifier while said third means are connected with both said first and second amplifiers, whereby said aerodynamic controls are not operable for vertical flight, while said controls by action on the jet are actuated and controlled by said stabilization chain.

2. A device as claimed in claim 1, comprising further a first and a second return loop associated with said controls by action on the jet and connected with said second amplifier, first detection means for detecting the position of said controls and supplying electric signals which are a function of said position of said controls via said first return loop, second detection means for detecting the speed of displacement of said controls and supplying electric signals which are a function of said speed of displacement of said controls via said second return loop, a delay circuit interposed in said second return loop, and further switching means for connecting said delay circuit during vertical flight of said aircraft and for disconnecting said second return loop during horizontal flight.

3. A device as claimed in claim 2, wherein said further switching means is associated with said main switching means to form a common switching means, said common switching means comprising an intermediate position corresponding to the passage from vertical flight to horizontal flight and vice versa, in which position said controls are actuated as in horizontal flight, said second return loop and said delay circuit remaining in operation.

4. A device as claimed in claim 1, comprising further a control device for the swinging of said aircraft from the vertical position to the horizontal position and connected to said second amplifier, said control device being connected at the desired moment and supplying a control signal of a given sign, duration and amplitude which is applied to said second amplifier whereby a swinging at a constant angular speed is obtained.

5. A device as claimed in claim 2 comprising a circuit-breaker and a delay relay, interposed between said control device and said second amplifier.

References Cited in the file of this patent
UNITED STATES PATENTS

| | | |
|---|---|---|
| 2,395,809 | Goddard | Mar. 5, 1946 |
| 2,734,698 | Straayer | Feb. 14, 1956 |